Jan. 18, 1927.  F. A. GERDING  1,615,010

SPRINKLER

Filed Feb. 13, 1924   2 Sheets-Sheet 1

F. A. Gerding  Inventor
by  Attorneys

Jan. 18, 1927.  1,615,010
F. A. GERDING
SPRINKLER
Filed Feb. 13, 1924  2 Sheets-Sheet 2

F. A. Gerding  Inventor
by  Attorneys

Patented Jan. 18, 1927.

1,615,010

UNITED STATES PATENT OFFICE.

FRED A. GERDING, OF BEDFORD, OHIO.

SPRINKLER.

Application filed February 13, 1924. Serial No. 692,505.

My invention relates to sprinklers and the principal object of my invention is to provide a sprinkler of the type herein disclosed having a radius greater than similar sprinklers heretofore constructed and in particular a radius sufficient to permit the sprinkler to be substituted on truck farms for the expensive and complex systems of water distribution now in use. In the drawings accompanying this specification and forming a part thereof I have shown, for purposes of illustration, one form which my invention may assume. In these drawings:

Figure 3 is a section on the line 3—3 of Figure 1, while

Figure 1:
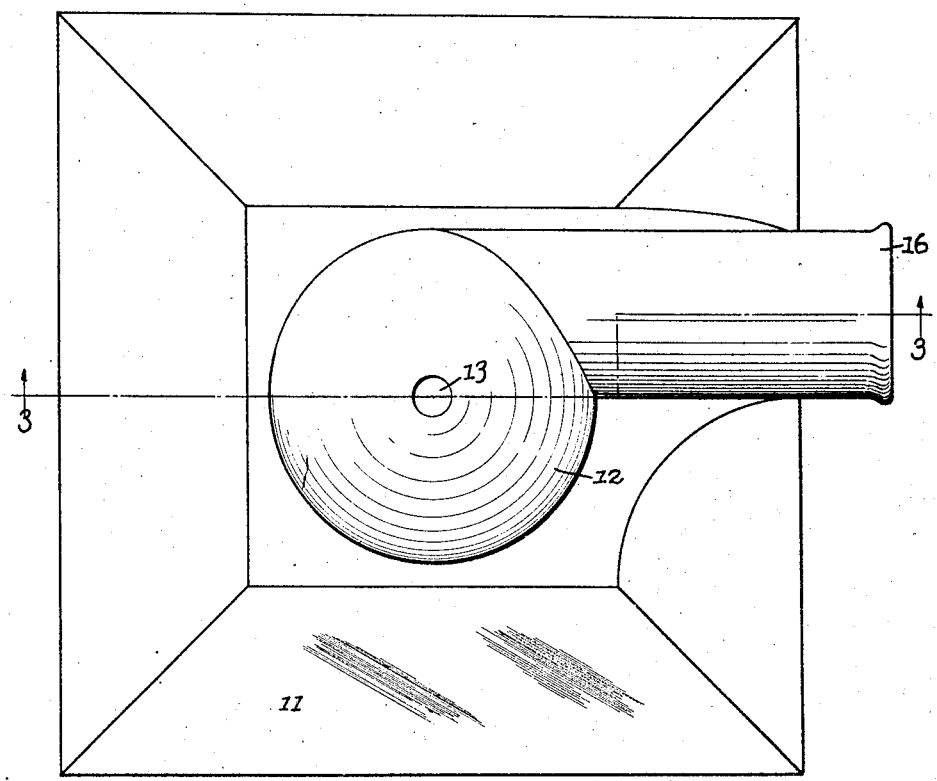
Figure 1 is a plan view of the embodiment of my invention herein disclosed.
Figure 2:
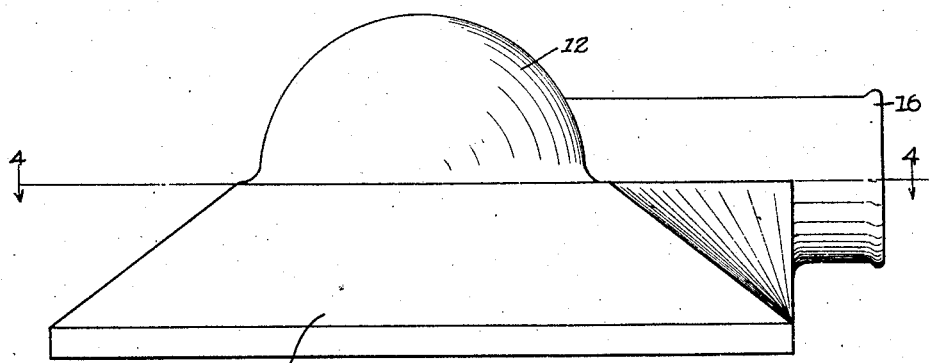
Figure 2 is a side elevation of the device shown in Figure 1.
Figure 3:
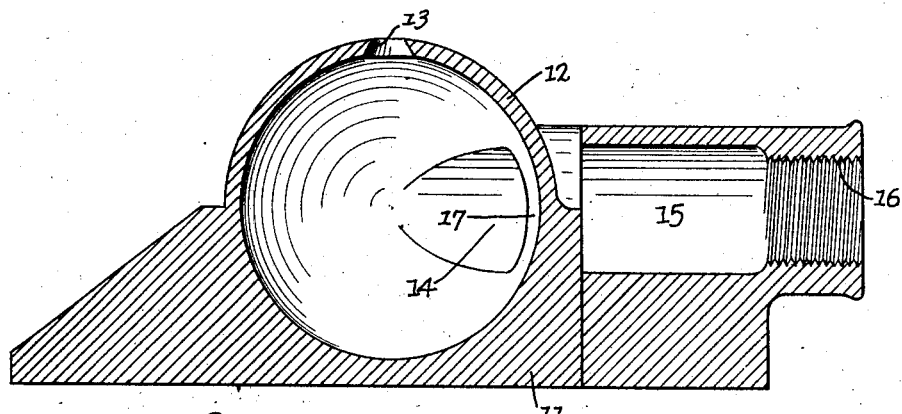
Figure 4:
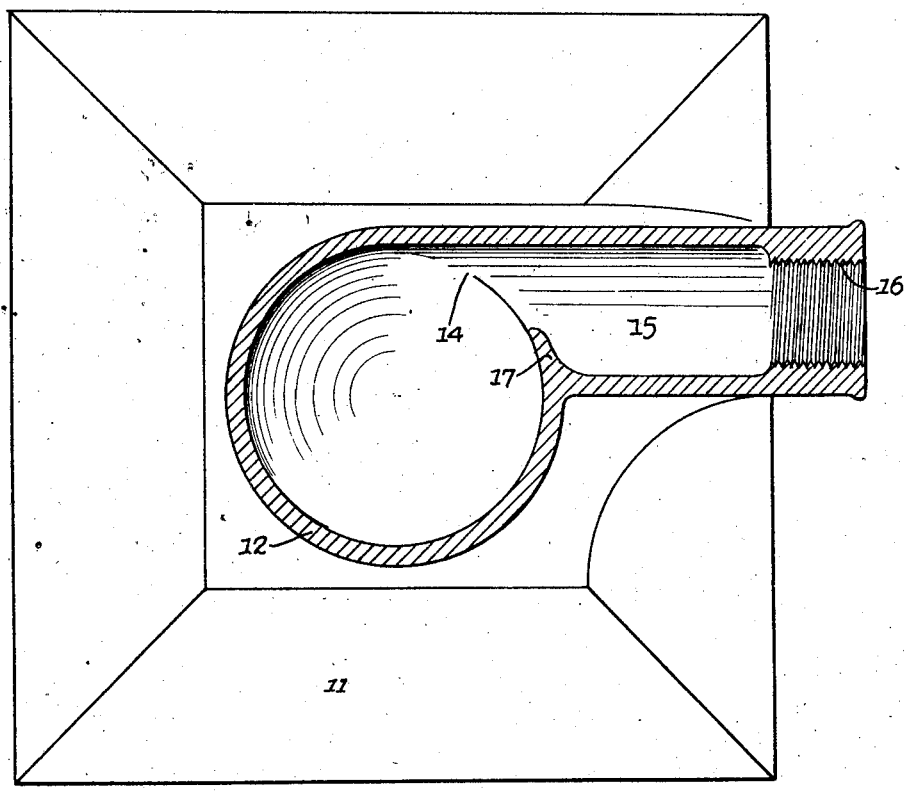
Figure 4 is a section on the line 4—4 of Figure 2.

The embodiment of my invention herein disclosed comprises a base 11 formed integral with a chamber 12 herein shown as exactly spherical in form and provided with an outlet opening 13 herein shown as of a diameter gradually decreasing from the interior of the chamber 12 to the exterior thereof and provided further with an inlet opening 14 herein shown as entering the chamber 12 tangentially, as bisected by the horizontal plane through the center of the chamber 12, and as in communication with a duct 15 also formed integral with the base 11 and screw threaded at its outer end 16 to receive the coupling member of a hose. In the embodiment of my invention herein shown there is also provided at the opening 14 and within the duct 15 an abutment 17 formed upon the inner side of the duct 15 as a continuation of the wall of the chamber 12 and arranged to forcibly direct the fluid against the wall of the chamber 12.

I am aware that it has heretofore been proposed to position the inlet opening tangentially with respect to the chamber and to provide therein an abutment directing the fluid against the wall of the chamber and I am also aware that it has been proposed to form the outlet opening bevelled and I find that each of these features has some effect in increasing the radius of distribution of the fluid. On the other hand, I also find that the use of the spherical chamber, particularly with the inlet and outlet position as herein shown, causes a material increase in the radius of distribution and in addition I find that the use of the spherical chamber either with the tangential inlet and the abutment or with the bevelled outlet or with both causes a far greater increase in radius of distribution than the sum of the increases resulting from each feature separately and in particular I find that a sprinkler constructed as herein shown when connected to a three-quarter inch hose and working under a normal city water pressure will distribute the fluid over a radius of approximately seventy-five feet and will secure substantially uniform distribution over the entire area covered.

I prefer to construct the sprinkler substantially as herein shown but at the same time I am aware that this construction may be variously changed and modified without sacrificing all of the advantages resulting therefrom or departing from the spirit of my invention and I therefore present this disclosure as illustrative only and my invention as not limited thereto.

I claim:

A sprinkler having a hollow generally spherical chamber provided with but two deviations from the generally spherical form, one the opening of a generally tangential inlet and the other the opening of a single generally radial outlet disposed substantially in the diametrical line perpendicular to the plane defined by the axis of said inlet and the center of said chamber.

In testimony whereof, I hereunto affix my signature.

FRED A. GERDING.